United States Patent [19]

Nusmeier

[11] Patent Number: 4,930,814

[45] Date of Patent: Jun. 5, 1990

[54] IDENTITY CARD

[75] Inventor: Hendrik W. Nusmeier, Huizen, Netherlands

[73] Assignee: Joh. Enschede En Zonen Grafische Inrichting B.V., Haarlem, Netherlands

[21] Appl. No.: 339,927

[22] Filed: Apr. 17, 1989

Related U.S. Application Data

[63] Continuation of Ser. No. 83,717, Aug. 10, 1987, abandoned.

[30] Foreign Application Priority Data

Aug. 12, 1986 [EP] European Pat. Off. ........... 86201413

[51] Int. Cl.[5] ........................ B42D 15/00; B44C 1/00; B05D 5/00; B32B 27/14

[52] U.S. Cl. .................................... 283/109; 156/240; 428/195

[58] Field of Search ........................ 283/90, 91, 92, 95, 283/96, 98, 109, 110; 156/238, 240, 244; 430/437; 428/195

[56] References Cited

U.S. PATENT DOCUMENTS

| | | | |
|---|---|---|---|
| 3,857,746 | 12/1974 | Blanco et al. | 156/240 |
| 3,928,669 | 12/1975 | Takahashi | 427/19 |
| 4,507,349 | 2/1984 | Fromson | 428/195 |
| 4,555,436 | 11/1985 | Geurtsen et al. | 156/240 |
| 4,581,266 | 4/1986 | Magnotta | 156/240 |
| 4,645,705 | 2/1987 | Abbott, Jr. | 156/240 |
| 4,664,735 | 3/1987 | Pernicano | 156/240 |
| 4,684,795 | 8/1987 | Colgate, Jr. | 156/240 |
| 4,692,198 | 9/1987 | Borresen | 156/240 |
| 4,707,707 | 11/1987 | Ohno | 156/240 |

*Primary Examiner*—Douglas D. Watts
*Assistant Examiner*—Paul M. Heyrana, Sr.
*Attorney, Agent, or Firm*—Ladas & Parry

[57] ABSTRACT

Identity card, comprising a sheet of synthetic material having a decoration pattern as is customary for papers of value and provided with information essential for the identification of the user or the object pertaining to the identity card, said decoration pattern and said information consisting of sublimatable coloring agents dissolved in said synthetic material and bound to said synthetic material. The identity card preferably comprises a sheet of polyester material. The decoration pattern and the information preferably consist of one or more of the coloring agents Sublaprint Blue 70.013, C.I. Disperse Yellow 61, C.I. Disperse Red 60 and/or C.I. Disperse Blue 3.

8 Claims, 2 Drawing Sheets

1

2

IDENTITY CARD

This is a continuation of co-pending application Ser. No. 083,717 filed on Aug. 10, 1987, abandoned.

BACKGROUND OF THE INVENTION

The invention has reference to an identity card comprising a sheet of synthetic material with a decoration pattern as is customary for papers of value and provided with information essential for the identification of the user or the object pertaining to the identity card.

Such identity cards are generally known nowadays. They are used for all kinds of purposes: card stating personal registration, card stating identity, credit card, cheque card or credit cheque, extract from an insurance policy, driver's licence, etc.

In those known cards the decoration pattern and the information considered to be essential for the identification of the user (personal data, portrait and/or signature, finger print) are printed, written or stamped on or adhered to the sheet of the synthetic material. This information may be protected by a laminate (adhered synthetic foil). Moreover the cards can be provided with a distinguishing relief print (embossing) or distinctive mark, e.g. in the shape of one or more magnetic strips or a postcode.

In practice it appears that the information on these known cards can be altered or replaced practically invisibly, for example by splitting up the cards into layers, cutting, using mechanical or chemical erasing methods, etc.

We have found that such "counterfeit techniques" are not possible without damaging or destroying the card beyond repair when the decoration pattern and the information essential for the identification of the user consist of sublimatable colouring agents dissolved in said synthetic material and bound to said synthetic material. The removal of information by extracting the colouring agents is not possible either without causing damage.

SUMMARY OF THE INVENTION

The invention therefore has reference to an identity card of the type as described above, the decoration pattern and the information comprising sublimatable colouring agents dissolved in the synthetic material and bound to said synthetic material.

The sheet of synthetic material has the current dimensions for identity cards, i.e. between 0.3 and 1.5 mm in thickness, between 5 and 10 cm in length and between 3 and 7 cm in breadth. Said sheet of synthetic material may consist of polymers, copolymers, block-copolymers or polycondensation products currently used for this purpose.

The synthetic material preferably contains one or more pigments so that it is not transparent; the sheet of synthetic material can then show a different picture on either side as the decoration pattern and the information comprise colouring agent(s) that penetrate into the sheet or synthetic material till a depth of 0.05 to 0.2 mm at the most, preferably till 0.1 mm at the most.

The decoration pattern and the information comprise colouring agents that generally are disperse colouring agents which sublimate at atmospheric pressure at temperatures between 160° and 220° C. and which are soluble in the used synthetic material.

Colouring agents that sublimate between 180° and 200° C. are preferred as such colouring agents are readily absorbed by the synthetic materials and absorption in a sheet of synthetic material does not present any problems.

Most of these colouring agents are included in the classes of nitro colouring agents, arylamine colouring agents, azo-colouring agents and anthraquinone colouring agents.

The colouring agents "Sublaprint Blue 700 13" of L. B. Holliday, C.I. Disperse Yellow 61, C.I. Disperse Red 60, C.I. Disperse Blue 3, suffice exceptionally well in combination with a sheet of polyester material, especially polybutylene-terephthalate. These colouring agents dissolve readily at sublimation temperature in such a sheet of polyester material, without the polyester softening and the sheet deforming. The colouring agent dissolved in the polyester cannot be removed without damaging the sheet of polyester material.

From the French Patent Specification 1,223,330 is is known to paint or to print textile materials, wholly or partially consisting of synethic fibres, by applying inks containing one or more sublimatable colouring agents to a sheet or paper in an even layer or in a pattern, to bring the side of the sheet of paper to which the ink has been applied into contact with a piece of textile material and to heat the whole so that the colouring agent(s) sublimate(s) and the textile material is painted or printed by the colouring agent(s).

In this way coarse patterns are formed on the surface of the textile material.

We have found that such a method can be used for the application of a decoration pattern and, if required, of the information essential for identification in a sheet of synthetic material.

Figure 1:
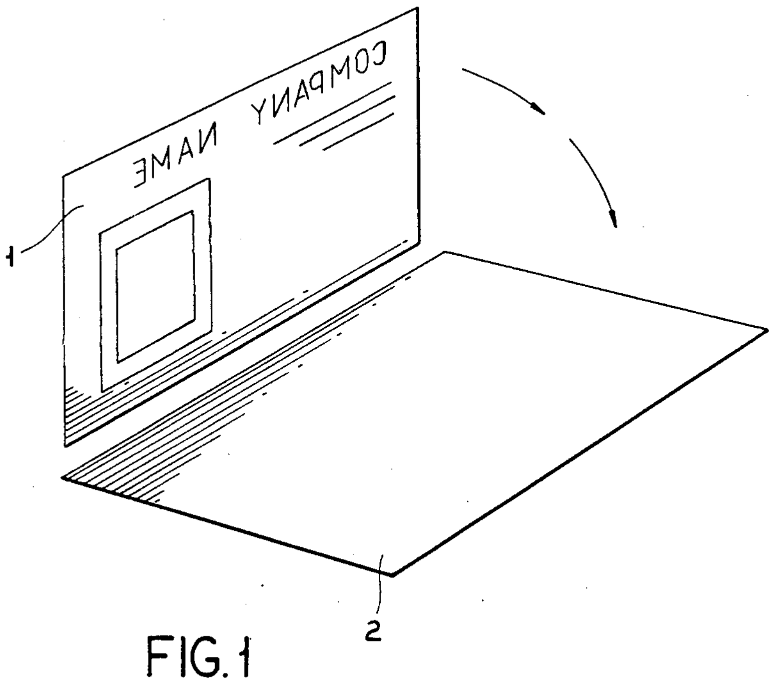
FIG. 1 is shows a temporary support and a synthetic foil.
Figure 2:
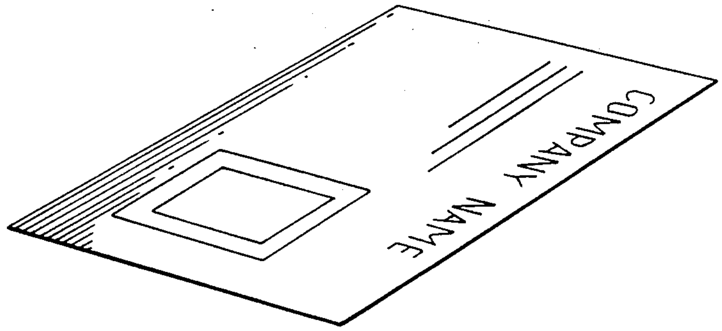
FIG. 2 shows the synthetic foil from FIG. 1 after the transfer process.
Figure 3:
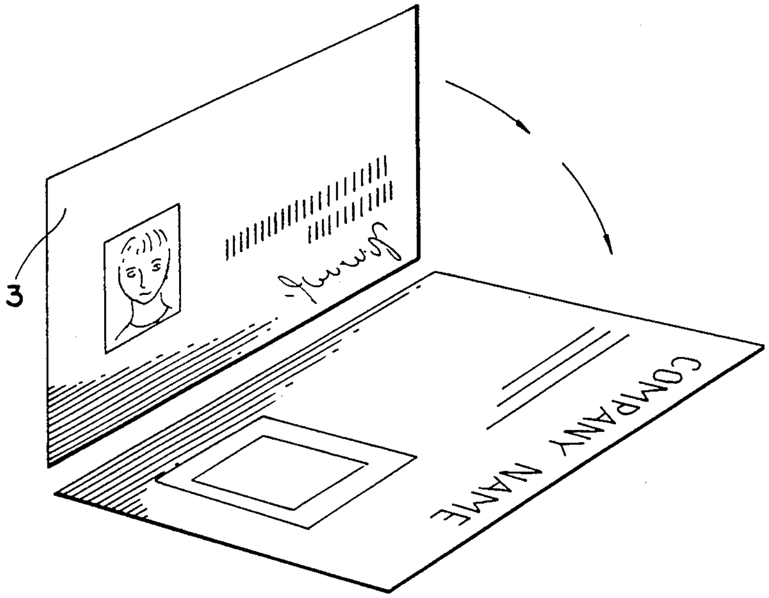
FIG. 3 shows a temporary support provided with a name, signature and photograph and the synthetic foil card shown in FIG. 2.
Figure 4:
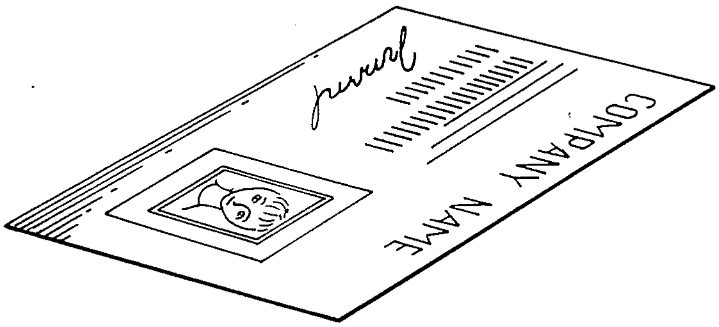
FIG. 4 shows the finished identity card after the completed transfer process.

To that end an inverted "intermediate image" of the decoration pattern and/or the standard information is applied onto a temporary support 1 using one or more known printing techniques and inks containing one or more colouring agents sublimatable at temperatures between 160° and 220° C.; the temporary support, pictured in FIG. 1, is placed on a sheet of synthetic material 2 in which the colouring agent(s) is/are soluble and the whole is heated so that the colouring agent(s) sublimate(s) and penetrate(s) in the form of the picture into the sheet of synthetic material; if required, this treatment is repeated once or several times with other temporary supports and other pictures and/or inks 3.

The temporary support may consist of a sheet of paper or a sheet of other material, for example cellophane foil, that is not affected by the temperatures that occur during the colouring agent transfer by sublimation; this paper should preferably have a closed structure that is such that the vapour of the colouring agent does not penetrate through the paper during the sublimation transfer of the picture. At the same time the paper must have a smooth surface and may not have any noticeable affinity for the colouring agent(s).

A smooth surface is especially favourable when a colouring agent picture with fine lines, as is usually required for the decoration pattern, must be applied by means of sublimation. On account of the smooth surface the ink picture easily comes off and the colouring agent quickly penetrates into the sheet or synthetic material in the thickness direction, a slight fading of the picture due to lateral diffusion of the colouring agent can be checked by the pigments preferably taken up in the sheet of synthetic material.

The ink with which an "intermediate image" is applied to the temporary support consists of a solution of one or more of the sublimatable colouring agents and a thickening agent in a, preferably organic, solvent.

The specific personal data (portrait, signature, finger print) can also be transferred in this way, if required. To that end a photo with a signature and/or finger print can be placed on a sheet of paper, for example, and a plate, showing an inverted image, can be made with these data, and with this plate a picture of an ink with sublimatable colouring agents can be made on a temporary support.

Another possibility is to apply the specific personal data directly onto the surface of the sheet of synthetic material. For this purpose, however, the surface of the sheet of synthetic material must generally first be made receptive for the ink containing sublimatable colouring agent(s), otherwise the synthetic material will repel the ink, causing the ink to contract to droplets. The surface can be properly rendered receptive for the ink by subjecting the sheet of synthetic material to a corona discharge.

EXAMPLE

A non-coated sheet of paper of 80 g/m$^2$ is printed over with a decoration pattern, as is customary for papers or value, by means of a copperplate printing procedure; the picture printed on the paper is the reflected image of the picture that is required on the identity card. When printing the following inks are used:

5 parts "Sublaprint Blue 70.013" of L. B. Holliday 5 parts ethyl cellulose (Ethocel E7, Dow Chemical), dissolved in 90 parts isopropanol.

The printed sheet of paper is placed face down on a polyethyleneterephthalate foil (0,35 mm in thickness) and is heated under pressure during 30 S at 190° C. on a press as is known from the confection industry.

On a second sheet of paper an "intermediate image" with personal data, including the signature and a screened portrait of the user, is applied with a second ink by means of offset printing.

The ink used for this purpose consisted of:

2.5 parts C.I. Disperse Red 60

2.5 parts C.I. Disperse Blue 3

5 parts ethyl cellulose 90 parts isopropanol

This printed sheet of paper is placed face down on the polyethyleneterephthalate foil too and is heated under pressure for 15 S at 200° C. After this the foil may be cut to the required size.

I claim:

1. An identity card resistant to counterfeiting comprising a single sheet of a non-transparent synthetic material formed by applying a solution of at least one sublimable coloring agent, a thickening agent and a solvent to a side of at least one temporary support so as to display decorative patterns, graphics and text in a mirror reversed manner, pressing the side of the temporary support against at least one side of the sheet of synthetic material, and heating both the temporary support and the sheet of synthetic material so that the coloring agent is dissolved in, and bound to, the sheet of synthetic material, said identity card being able to have different images on both sides single of synthetic material.

2. An identity card according to claim 1, wherein said card comprises a sheet of polyester material.

3. An identity card according to claim 2, wherein the coloring agent includes Sublaprint Blue 70.013, C.I. Disperse Yellow 61, and C.I. Disperse Red 60.

4. An identity card according to claim 3, wherein said coloring agent includes C.I. Disperse Blue 3.

5. A method for producing a card having decorative patterns, graphics and text displayed thereon, comprising the steps of:

applying a solution of at least one sublimable coloring agent, a thickening agent, and a solvent to a side of at least one temporary support so as to display the decorative patterns, graphics and text in a mirror reversed manner;

pressing the side of the temporary support into contact with at least one side of a single sheet of non-transparent synthetic material, and heating the temporary support and the sheet of synthetic material so as to cause the coloring agent to dissolve in, and be bound to, said synthetic material, said card being able to have different images on both sides of said single sheet of synthetic material.

6. A method according to claim 5, wherein the side of the temporary support is smooth, and wherein the sheet of synthetic material is made of polyester.

7. A method for producing a card having decorative patterns, graphics and text displayed thereon, comprising the steps of:

subjecting a single sheet of synthetic material to a coronal discharge;

applying a solution of at least one sublimable coloring agent to at least one side of said sheet of synthetic material so as to display the decorative patterns, graphics and text; and heating the sheet of synthetic material so as to cause the coloring agent to dissolve in, and be bound to, said synthetic material, said card being able to have different images on both sides of said single sheet of synthetic material.

8. A card comprising a single sheet of synthetic material formed by applying a solution of at least one sublimable coloring agent, a thickening agent and a solvent to a side of a temporary support so as to display decorative patterns, graphics and text in a mirror reversed manner. pressing the side against at least one side of the sheet of synthetic material, and heating both the temporary support and the sheet of synthetic material so that the coloring agent is dissolved in, and bound to, the sheet of synthetic material, said card being able to have different images on both sides of said single sheet of synthetic material.

* * * * *